Oct. 17, 1939.  R. N. FALGE ET AL  2,176,214
HEADLIGHT TESTER
Filed Aug. 26, 1935  4 Sheets-Sheet 3
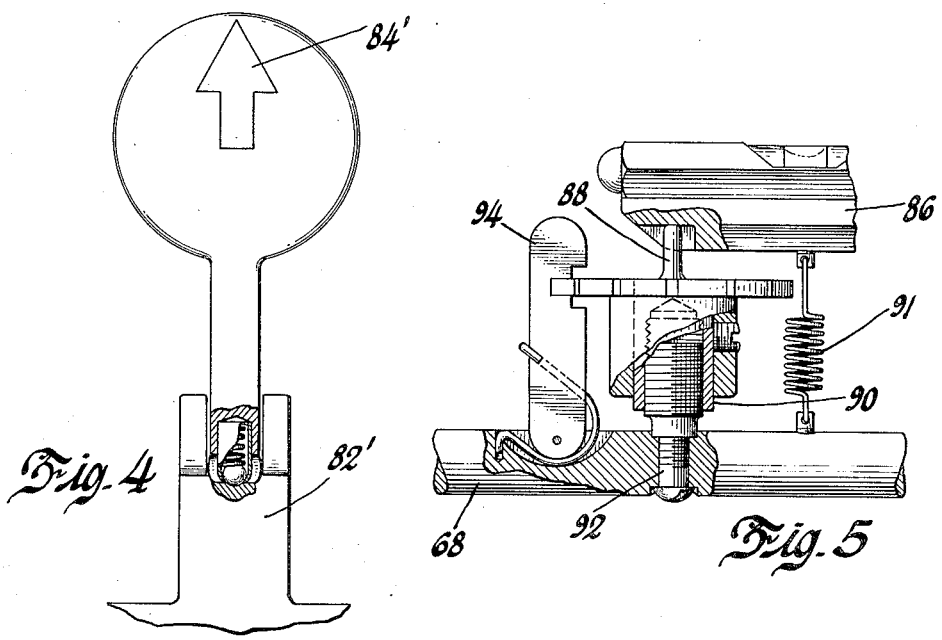
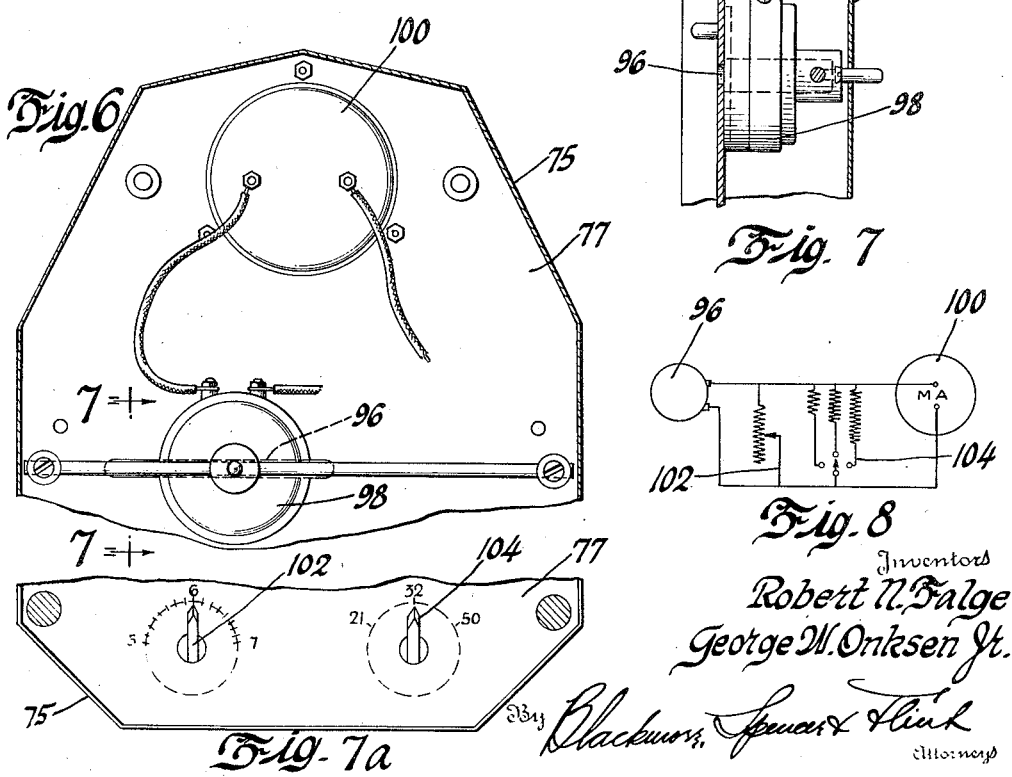
Inventors
Robert N. Falge
George W. Onksen Jr.
By Blackmore, Spencer & Flint
Attorneys Oct. 17, 1939.   R. N. FALGE ET AL   2,176,214
HEADLIGHT TESTER
Filed Aug. 26, 1935   4 Sheets-Sheet 4

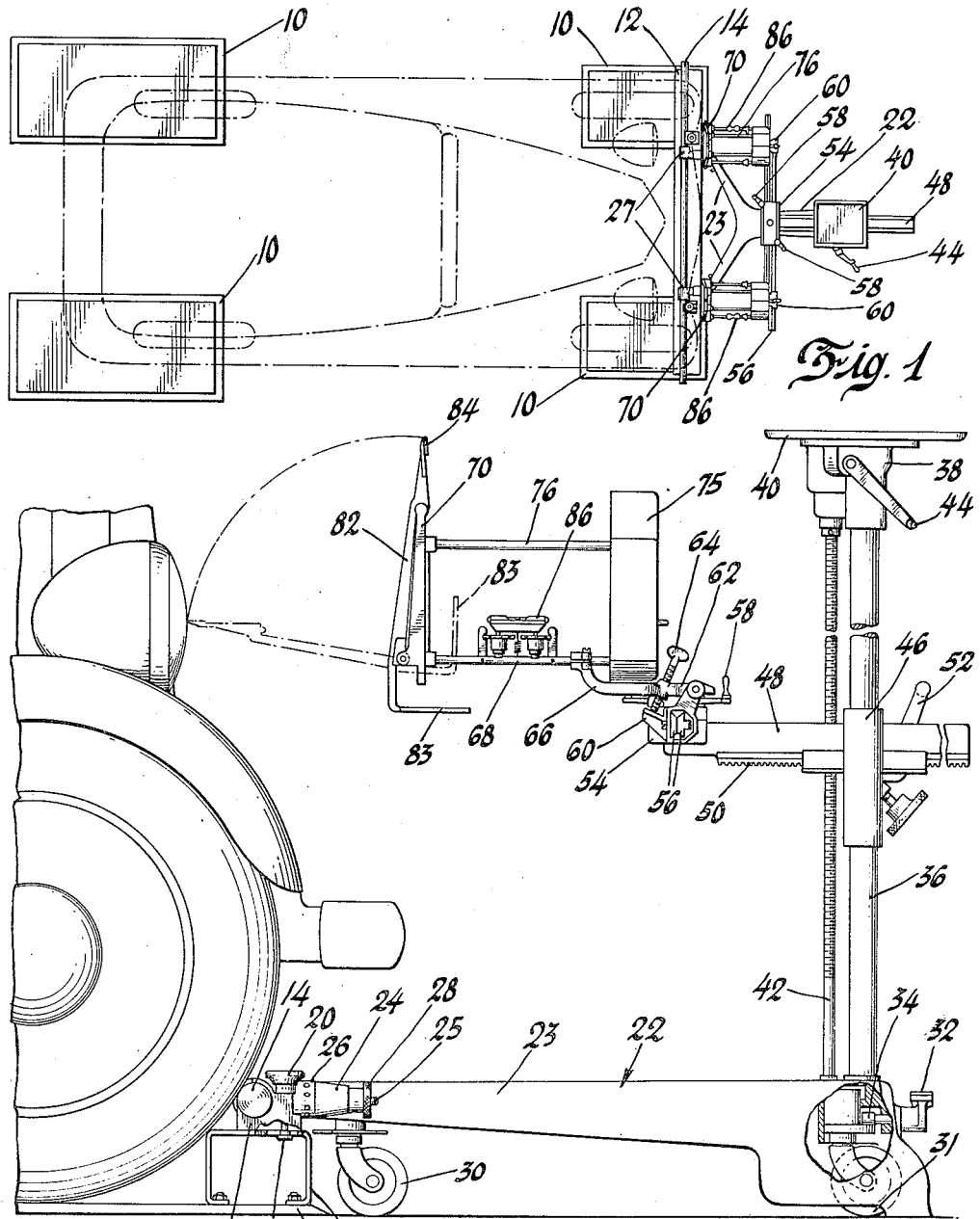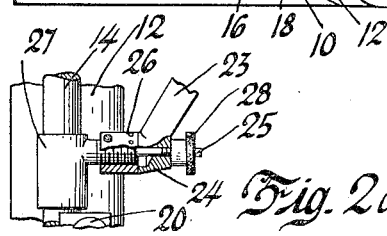

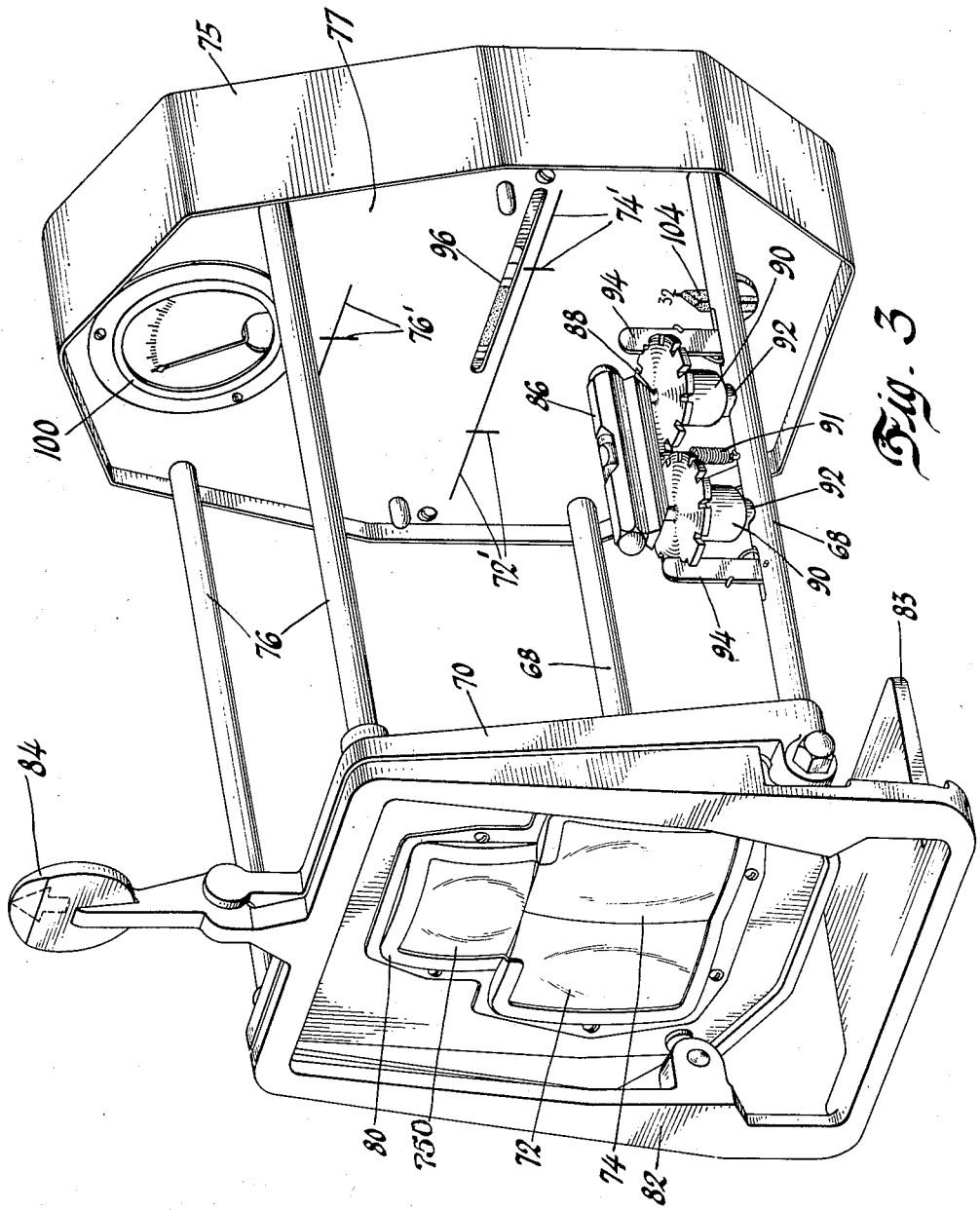

Inventors
Robert N. Falge
George W. Onksen Jr.
By Blackmore, Spencer & Flint
Attorneys Patented Oct. 17, 1939

2,176,214

UNITED STATES PATENT OFFICE 2,176,214

HEADLIGHT TESTER

Robert N. Falge and George W. Onksen, Jr., Anderson, Ind., assignors to General Motors Corporation, Detroit, Mich., a corporation of Delaware Application August 26, 1935, Serial No. 37,841

19 Claims. (Cl. 88—14)

This is an improvement on a headlight tester described and claimed in prior application of Robert N. Falge, S. N. 754,562, filed November 24, 1934 (Patent No. 2,144,838, issued January 24, 1939).

In that application there is disclosed a test head adapted to be positioned in front of a headlamp, the test head consisting essentially of a lens holder equipped with lenses adapted to bring a major portion of the rays from the headlamp to a focus on a screen secured in spaced relation to the lens holder. The screen is provided with suitable reference lines to give a means of gauging the accuracy of aiming of the headlamp while the appearance of the miniature light beam patterns on the screen gives an indication not only of the condition of focusing, but also a rough indication of the intensity of the beam. The test head is preferably pivoted to its support and is provided with an adjustable level which affords a gauge in adjusting the aim of the lamps. An additional feature consists in the provision of a slot in the screen behind which is placed a photoelectric cell connected with a suitable meter to give readings of intensity more accurate than can be obtained by visual inspection.

The present application discloses a number of improvements, one of which consists in the employment of spherical lenses instead of cylindrical lenses. Thus, for the lower cylindrical lens of said Falge's earlier application there are substituted two spherical lenses side by side, while the upper cylindrical lens is replaced by a single spherical lens. The spherical lenses, of course, produce more concentrated beam patterns and so aid inspection. By using two spherical lenses with substantially parallel axes in place of the single cylindrical lens, two beam patterns are obtained and by comparing the patterns it is possible to determine whether one side of the lens is defective. The use of spherical lenses is also desirable in that it facilitates lateral aiming. Since spherical lenses condense the rays laterally as well as vertically, they reveal the vertical cutoff in asymmetrical headlamps, and so afford a guide in aiming and focusing to secure the desired lateral distribution of light.

Another improvement consists in mounting the test head on a separate stand which may be moved into the desired position in front of the car, and is provided with the necessary adjustments to properly position the test head. To assist in this positioning we have preferred to provide the test head with a swinging pointer.

To aline the test heads longitudinally of the car, we have preferably provided the stand supporting the heads with a bar adapted to engage the front tires so that when the tires are pointed straight ahead, the stand and, with it, the heads, will be properly positioned.

Other improvements will be pointed out in the course of the following description.

In the drawings:

Figure 1 is a top plan view of the complete testing equipment with an automobile shown in dotted lines in position to have its headlamps tested.

Figure 2 is a side view of the testing equipment.

Figure 2a is a top plan view of a portion of the base of the test stand.

Figure 3 is a perspective view of one of the test heads.

Figure 4 is a fragmentary plan view showing a modified pointer.

Figure 5 is a fragmentary view, partly in section, showing the construction of the adjustable mounting for one of the levels.

Figure 6 is a view, partly broken away, showing the rear of the screen or target.

Figure 7 is a vertical section on line 7—7 of Figure 6 showing the mounting of the photoelectric cell.

Figure 7a is a fragmentary view showing the lower portion of the front of the target.

Figure 8 shows the circuit used with the cell.

Figure 9:
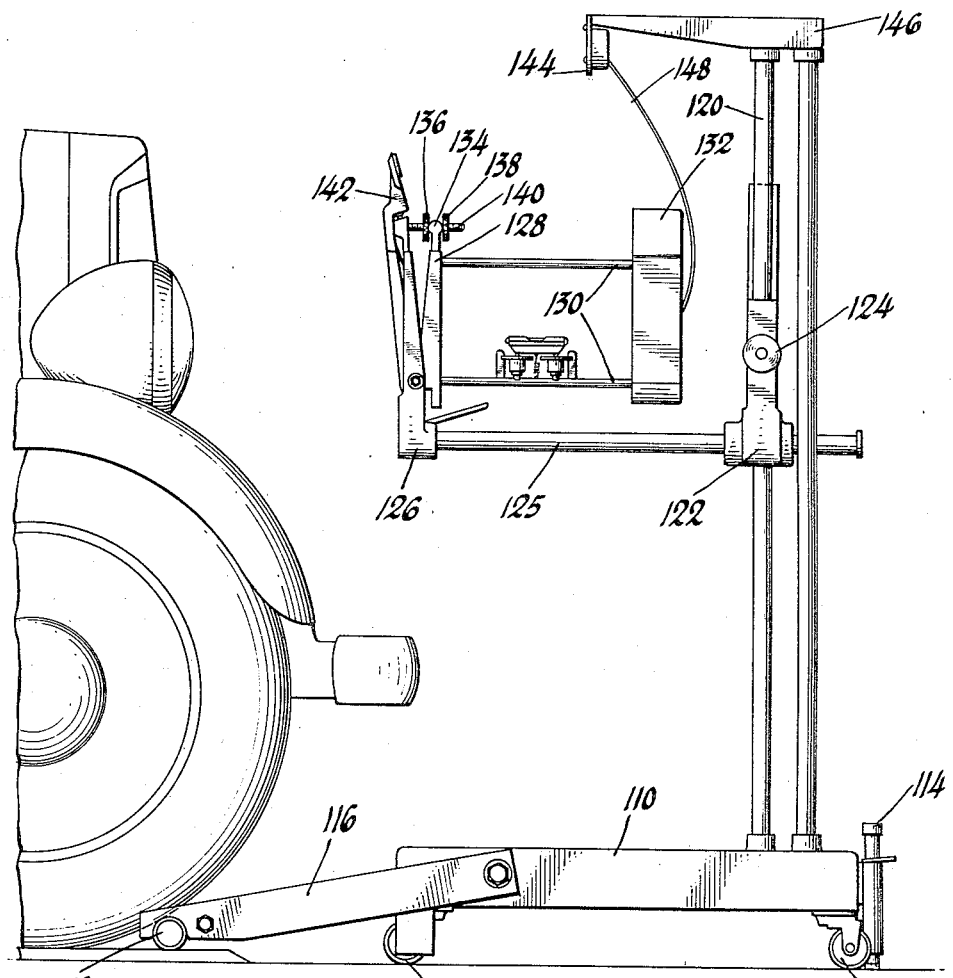
Figure 9 is a side view of a modified form of testing equipment adapted to hold one test head only.

Referring to Figure 1, 10 indicates steel plates mounted in the floor so as to be substantially level. The rear plates 10 are longer than the front ones to care for cars of different wheel bases. To the front plates 10 is secured a bumper bar 12 of box section. If preferred, two separate bumper bars may be employed. 14 indicates a bar adjustably mounted on the bumper bar 12 by means of brackets 16 held to the bumper by bolts 18 slidably received in slots in the bar 12, and provided with nuts 20 to clamp the ends of the bar in adjusted position. As shown in the drawings the automobile is run on the stand with its front wheels straight ahead until it engages the bumper bar 12; thereafter the bar 14 is moved forwardly until it engages the tires and the nuts 20 may then be tightened if desired to lock the bar in position. 22 indicates the base of the test stand, which is preferably in the form of a Y-shaped casting, comprising forwardly diverging arms 23 provided at their extremities with sleeves 24, encircling bolts 25, and bearing against nuts 26 threaded on extensions of sleeves 27 encircling the bar 14. Nuts 28 clamp the ends of the arms 23 against the nuts 26. The purpose of the nuts 26 is to permit adjustment of bar 14 to right angular relation with respect to the axis of the tester when initially assembled.

To facilitate moving the stand about, the base 22 may be provided with adjustable casters 30 at its forward end and with a retractible caster 31 at its rear end. Any suitable means may be provided for retracting the caster 31. We have indicated at 32 a foot pedal adapted to effect rotation of cam 34 which engages the support of the caster 31 and so effects its advance. Similar means may be provided to advance the forward casters 30.

Projecting upwardly from the rear of the base 22 are a pair of tubular supports 36 to the top of which is fixed a casting 38 supporting a shelf 40 which may be employed to hold parts used in servicing the lamps. Journalled at its bottom in the platform 22, and at its top in the casting 38 is a revoluble screw shaft 42. Crank 44, journalled in the casting 38, is connected with the shaft 42 by suitable gearing, not shown, so as to effect rotation of it.

Mounted on the supports 36 is a slide 46 to which is secured a follower, not shown, adapted to engage the screw shaft 42 so that upon rotation of the screw shaft the slide 46 is moved up and down. 48 indicates a carriage supported for sliding movement by the slide 46, and provided with rack 50 adapted to be engaged by a pinion, not shown, to which is secured crank 52 so that upon rotation of the crank the carriage 48 may be moved toward or from the headlamps. To the end of the carriage 48 is secured housing 54 in which are slidably mounted racks 56 engaged by pinions, not shown, secured to cranks 58. To one end of one of the racks 56 is secured a bracket 60 and a similar bracket 60 is secured to the opposite end of the other rack. There is pivoted to each of the brackets 60 a support 62. Screw 64 threaded in the support 62 and engaging a suitable surface on bracket 60 permits swinging adjustment of the support. The forward end of each support 62 is forked to provide arms 66 which are clamped to the lower spacing bars 68 connecting the lens holder 70 of the test head with the screen 77 secured in housing 75. A similar pair of spacers 76 is provided at the top of each test head.

The details of the test head are best shown in Figures 3 to 8. Suitably secured in the lens carrying frame 70, as by means of bezel 80, are spherical lenses 72, 74 and 75. Preferably each of these lenses is of the plano-convex type. In the case of a properly focused headlamp, lens 75 will bring the rays from the top of the lamp to a focus on the vertical and horizontal reference lines 76' on screen 77. Lens 72 will bring the rays projected from one side of the central zone of the lamp to a focus in proper relation to the horizontal and vertical reference lines 72', and lens 74 will correspondingly bring the rays from the other side of the central zone of the headlamp to a focus in proper relation to the horizontal and vertical reference lines 74'. To the bottom of the lens carrying frame 70 is pivoted pointer frame 82 provided with arrowhead 84. The pointer frame 82 is adapted to be swung to the dotted line position shown in Figure 2 to enable the test head to be properly adjusted into alinement with the center of the lamp.

We prefer to locate the target slightly closer to the spherical lenses than the focal distance so that the image is slightly out of focus. This sharpens up the edges of the hot spot and minimizes errors in judgment between different operators as to the exact location of the cut-off.

On one of the supporting bars 68 of each of the test heads is mounted a level 86. The opposite ends of the level 86 are pivotally supported on studs 88 formed on adjusting nuts 90 mounted on bolts 92 extending upwardly from supporting bar 68. Spring pressed detents 94 are adapted to engage notches in the periphery of nuts 90 to hold the level in properly adjusted position. Coil spring 91 prevents separation of level 86 from the studs 88. The level and its adjustable mounting is substantially the same as that disclosed in the prior Falge application.

We may provide the screen 77 with slot 96 behind which is arranged the photoelectric cell 98 connected to microammeter 100 so as to give a reading of light intensity. As explained in the copending application of Robert N. Falge, S. N. 31,759, filed July 17, 1935 (Patent No. 2,111,585, issued March 22, 1938) in measuring intensity, it is essential to compensate for variations in battery voltage and bulb candle power by employing suitable rheostats in the circuit. Thus 102 indicates a rheostat connected between the photoelectric cell 98 and the ammeter 100 as shown in Figure 8 so as to compensate for variations in battery voltage. 104 indicates a rheostat arranged in the circuit as shown in Figure 8 and adapted to compensate for variations in bulb candle power. While we have shown the compensators as arranged in shunt with the ammeter, if preferred, they may be arranged in series, or in combination of shunt and series relation as disclosed in the said copending application of Falge, S. N. 31,759.

In the use of the tester the car is driven on the plates 10 to the position shown in Figure 1 with the front wheels straight ahead. With the caster 31 in supporting position the tester is then moved forward until the bar 14 engages both tires, and the axis of the tester is thus located parallel to the central axis of the car. Caster 31 is then retracted and the weight of the tester will normally be sufficient to hold it in position. However, if desired the nuts 20 may be tightened to lock the tester in place. The lamp mountings are then preferably loosened sufficiently to permit rough aiming of the lamps straight ahead. Next the pointer frames 82 are swung to horizontal position, and the test heads are moved up or down and to one side or the other as may be necessary to center the arrows 84 on the lamps. This adjustment of the test heads is effected by manipulating handles 44, 52 and 58. Should it prove that one lamp is lower than the other because of a sagged spring, or the like, it may be necessary to subsequently make a separate adjustment of the pointer for the sagging lamp. It is now preferable to swing the pointer frame 82 upwardly out of the way.

As explained in the prior application of Robert N. Falge, S. N. 754,562, one of the screws 90 supporting the level is set to compensate for variations in the slope of the supporting plates, and once set, should not be disturbed. The other adjusting nut 90 is rotated to the position at which it is desired to aim the top, or other part, of the beam above or below the lamp center level, making allowance for loading of the car, and other variations. Next the screw 64 is adjusted to center the bubble in the spirit level 86. The test heads are now in properly adjusted position so that if the headlamp is correctly adjusted it should project the portions of the beam pattern in proper relation to the reference marks on the screen 77. The next operation consists in turning on the upper or high beam of the headlamps and rotating the lamps about their own axes slightly until the two lower beam patterns on the screen 77 are in line sidewise. This indicates that the flutes on the lens are now in correct vertical position. Following this the lamp supporting bolts should be tightened down somewhat to hold the adjustment, and thereafter the lamp door may be removed. Following inspection of the socket and bulbs, the lamps should be plumbed with the aid of a spirit level or plumb bob so that the reflector faces are straight up and down.

Next the lamps are aimed sidewise until the upper pattern on the screen 77 is centered with respect to the vertical line 76'.

If now the bulb is accurately focused in the lamp, the patterns projected by the lenses 72 and 74 will be as small and bright as possible. With the upper beam pattern properly centered sidewise, the two lower patterns will center sidewise between the two vertical lines 72' and 74'. The tops of the patterns projected by lenses 72 and 74 will likewise be properly located with respect to the corresponding horizontal lines on the screen. Should the lamps not project the proper patterns on the screens, the attendant will be required either to adjust the bulbs, shift them, or substitute new ones until proper patterns are obtained. Following this the lens may be replaced and then the pattern should again be checked with the reference lines on the screen. Assuming that the lamp is now in properly focused condition the patterns projected through the lens will be oriented on the screen in substantially the same manner as the patterns projected without the lens.

The next operation consists in aiming the lamp. The position of the beam on the screen 77 with respect to the horizontal reference lines is noted, and if the lamp is aimed too high or too low, it is tilted in the proper direction to make the necessary correction. In the case of asymmetric headlamps, that is, headlamps in which one of the beams from one of the lamps is higher on the right side of the road than on the left, it is necessary to be sure that the left-hand edge of the upper part of the beam be properly aimed with respect to the vertical lines on the chart, and if not properly aimed, the lamp may be swung to one side or the other to make the necessary correction.

In the use of the device to measure headlight intensity, the test heads may be swung up or down by manipulation of screw 64 until a maximum reading is obtained on the milliammeter 100. This reading, of course, should be taken with compensators 102 and 104 set in proper position to make allowance for battery voltage and bulb candle power. A similar compensator may be employed to care for variations in the individual photoelectric cell, and this compensator may be fixed in position or adjustable as desired. The reading of intensity may be compared with readings on a suitable chart to determine whether the light output of the lamp is as high as it should be or not.

The tester is capable of considerable variation in practice. In Figure 4 there is shown a slight modification in which the arrow 84' is pivotally mounted in the pointer frame 82' so that it may be swung out of the way if desired.

In Figures 2, 3 and 9 the pointer frame 82 is provided with an extension 83 adapted to intercept light going to the screen so as to insure that the attendant will swing the frame to its upper position before going ahead with the test. In many instances the extension 83 may be dispensed with.

Figure 10:
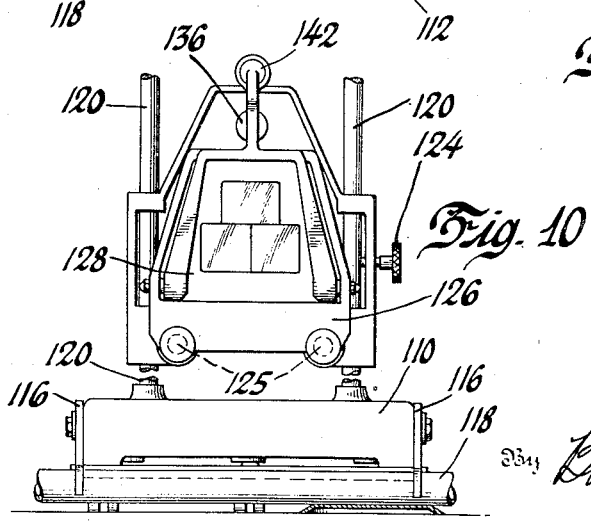
Figure 10 is a front view of the device of Figure 9, but with parts of the support broken away, giving a collapsed appearance.

In Figures 9 and 10 there is shown a modification in which the supporting structure carries but one test head. Here 110 indicates a platform suitably mounted on casters 112, and provided with supports 114 adapted to be advanced to lift the casters off the floor. To the forward end of the platform 110 are pivoted arms 116 adapted to engage bar 118 which is placed in contact with the tires of the two front wheels just as in the case of bar 14 of Figures 1 and 2. Extending upwardly from platform 110 are supports 120 on which is slidably mounted the frame 122 adapted to be locked in position by manipulating nut 124. Extending forwardly from the frame 122 and slidably mounted therein are the supporting rods 125 having bracket 126 secured to their forward ends. To the bracket 126 is pivoted the test head comprising lens frame 128 secured by spacers 130 to the screen assembly 132. The lens frame 128 is provided with an extension 134 received between nuts 136 and 138 threaded on bolt 140 mounted in the member 126. By adjusting nuts 136 and 138 the elevation of the test head may be varied. The test head is provided with a spirit level of the same type previously described. To the lens frame 128 is pivoted the pointer frame 142 functioning in the manner previously described.

Obviously, with this construction it will be necessary to complete the aiming and focusing of one lamp before moving the tester in position to service the other lamp. However, the arrangement has the advantage of reducing the cost of the equipment.

In this modification, I have shown at 144 a milliammeter which may be mounted on shelf 146 secured to the tops of the uprights 120. This ammeter may be provided with suitable leads 148 going to the photometer in the screen assembly. This location of the ammeter has the advantage of enabling the driver of the car to see the output rating of his lamps.

We claim:

1. In a headlight tester, a stand, a vertically adjustable slide mounted on the stand, a horizontally adjustable carriage mounted on the slide, a plurality of horizontally adjustable brackets mounted on the carriage for movement at right angles to the direction of movement of said carriage, each of said brackets being adjustable independently of the other so as to be capable of being moved toward or away from the other, and a test head mounted on each of said brackets, the axes of the test heads being substantially parallel.

2. In the combination as defined in claim 1, each of said test heads being mounted on its bracket by means of a horizontal pivot, and means for holding each of said test heads in the desired position of pivotal adjustment.

3. In a headlight tester, a stand adapted to be positioned in front of the headlamps to be tested, an upright on the stand, a slide mounted on the upright for vertical adjustment, means for locking the slide in adjusted position on the upright, a carriage slidably mounted on the slide for movement at right angles to the upright, a test head pivotally mounted on the carriage on a horizontal pivot for adjustment in a vertical plane, a pointer pivotally mounted on the test head on a horizontal pivot extending transversely of the test head, the axis of the pointer lying in a vertical plane containing the axis of the test head, said pointer normally occupying an inoperative vertical position but adapted to be swung forwardly into substantially horizontal position in front of the test head such that it may engage the front of the headlamp to be tested to assist in alinement of the test head with the headlamp, and means for holding the pointer in horizontal position.

4. In a headlamp tester the combination of a bumper adapted to engage the front wheels of an automobile to limit its forward movement, means for securing the bumper to a fixed support, a bar adjustably mounted on said bumper and adapted to be positioned in engagement with corresponding horizontally spaced portions of the said front wheels to establish a reference plane substantially perpendicular to the car axis, a support in engagement with the bar so as to fix the position thereof with respect to said plane, and a test head for testing headlamps adjustably mounted on said support so as to be capable of being positioned to receive light from an automobile headlamp.

5. A test head comprising a frame, a screen mounted on the frame, a lens holder having a focusing lens therein, means for mounting the lens holder on the frame in advance of the screen, a pointer pivoted to the forward portion of the frame on a transverse axis so as to be capable of being swung to horizontal position projecting in advance of the test head to assist in alining the test head with the headlamp or to be swung to rearward retracted position, and means for supporting the pointer in either of said positions.

6. A test head comprising a frame, a screen mounted on the frame, a lens holder having a focusing lens therein, means for mounting the lens holder on the frame in advance of the screen, a pointer comprising an apertured member pivoted to the forward portion of the frame on a transverse axis so as to be capable of being swung to a hrizontal position projecting in advance of the test head to assist in alining the test head with a headlamp or to be swung into retracted position with the aperture alined with the lens axis to permit the light from the headlamp to pass through the aperture onto the lens.

7. In a headlight tester the combination of a stand, a support adjustably mounted on the stand, a plurality of test heads having their axes arranged in parallel vertical planes, said test heads being independently pivoted to the support for movement in said planes about a horizontal transverse axis into forwardly extending position with their axes alined with the axes of the corresponding headlamps being tested, and stops for limiting the forward movement of the test heads.

8. In a headlight tester the combination of a stand, a support, a plurality of test heads having their axes arranged in parallel vertical planes, said test heads being transversely alined on said support and being independently pivoted to the support for movement in said planes about a horizontal transverse axis extending substantially perpendicular to said planes into forwardly extending position with their axes alined with the axes of the corresponding headlamps being tested, and means for limiting the forward movement of the test heads.

9. The combination of a pair of spaced plates for supporting the front wheels of an automobile, a bar connecting said plates and a headlight tester including a supporting stand having a base provided with a pair of forwardly projecting supporting arms secured to said bar, and supporting means for the rear of said base.

10. The combination of a pair of spaced plates for supporting the front wheels of an automobile, a bar connecting said plates and having its ends adjustably secured thereto for movement forwardly or rearwardly thereof, and a headlight tester including a supporting stand having spaced forwardly projecting supporting arms secured to said bar, and supporting means for the rear of said stand.

11. The combination of a pair of spaced plates for supporting the front wheels of an automobile, a bar connecting said plates having its ends adjustably secured thereto for movement forwardly or rearwardly thereon, and a headlight tester including a supporting stand having spaced forwardly projecting supporting arms adjustably secured to said bar, and supporting means for the rear of said stand.

12. A headlight tester comprising a supporting base, spaced uprights secured to the base, rigid means connecting the upper ends of the uprights, a support having portions slidably guided for vertical movement on the uprights, said support being provided with horizontal guiding means, a bracket slidably mounted in said guiding means, a test head for testing headlights, means for connecting the test head to the bracket for pivotal movement in a vertical plane about a horizontal pivot extending at right angles to the path of sliding movement of said bracket and means for holding the test head in desired position about said pivot.

13. In the combination as defined in claim 12, a level on said test head extending parallel to the path of sliding movement of the bracket and the test head, and means for adjusting the tilt of said level so that the level affords a guide in adjusting the tilt of the head.

14. In a headlight tester the combination of a stand, supporting means mounted on the stand for vertical and horizontal adjustment, a plurality of test heads, means for mounting each of said test heads on the supporting means with their axes in parallel planes, said mounting means being adjustable vertically independently of the vertical adjustment of the supporting means to permit either of the test heads to be brought into aligned relation with one of the headlamps of an automobile to indicate its focus and aim, each of said test heads comprising a screen open to view from substantially all sides and an unobstructed condensing lens having an area equal to a large portion of that of the headlamp lens, said condensing lens being supported in advance of the screen and being adapted to receive and bring to a focus on the screen a substantial portion of the headlamp beam.

15. In the combination as defined in claim 14, each of said mounting means including a transverse horizontal pivotal connection with said test head about which said head is adapted to be rocked.

16. In the combination as defined in claim 14, each of said mounting means including a transverse horizontal pivotal connection with said test head about which said head is adapted to be rocked, and a level adjustably mounted on each of the test heads in parallel relation to the axis thereof to afford a reference plane in focusing and aiming.

17. In a headlight tester, a stand adapted to be positioned in front of the headlamps to be tested, an upright on the stand, a slide mounted on the upright, and adapted to be locked in adjusted position thereon, a carriage slidably mounted on the slide for movement at right angles to the upright, a test head pivotally mounted on the carriage for adjustment in a vertical plane, a pointer pivotally mounted on the test head on a pivot extending transversely of the axis of the test head, said pointer normally occupying a retracted position but adapted to be swung forwardly into substantially horizontal position ahead of the test head and pointing at the headlamp to be tested to assist in alignment of the test head with the headlamp, and means for holding the pointer in either its horizontal or retracted position.

18. In a headlight tester, a stand adapted to be positioned in front of the headlamps to be tested, an upright on the stand, a slide mounted on the upright for vertical adjustment, means for locking the slide in adjusted position on the upright, a test head pivotally mounted on the slide on a horizontal pivot for adjustment in a vertical plane, a pointer pivotally mounted on the test head on a horizontal pivot extending transversely of the test head, the axis of the pointer lying in a vertical plane containing the axis of the test head, said pointer normally occupying an inoperative vertical position but adapted to be swung forwardly into substantially horizontal position in front of the test head such that it may engage the front of the headlamp to be tested to assist in alignment of the test head with the headlamp, and means for holding the pointer in horizontal position.

19. In an apparatus for testing headlights upon an automobile, a test head, means for supporting said test head in alignment with one of said headlights and spaced from the lens thereof, said test head comprising a screen having vertical and horizontal reference marks thereon, a lens support in advance of the screen, a spherical lens carried by the support parallel to the screen, the distance between the lens and the portion of the screen having reference marks thereon being slightly less than the focal length of the lens, said lens being unobstructed and of sufficient size to encompass a substantial proportion of the light from the headlight lens so as to reproduce upon the screen a large number of variously oriented and more or less superposed images of the light source, said images merging into a smooth beam pattern in which the component images are indistinguishable, said beam pattern indicating the state of focus of the headlamp not only by the position of the pattern with respect to the reference marks but also by the distribution of light in the reproduced beam pattern portion.

ROBERT N. FALGE.
GEORGE W. ONKSEN, Jr.